Figure 2:
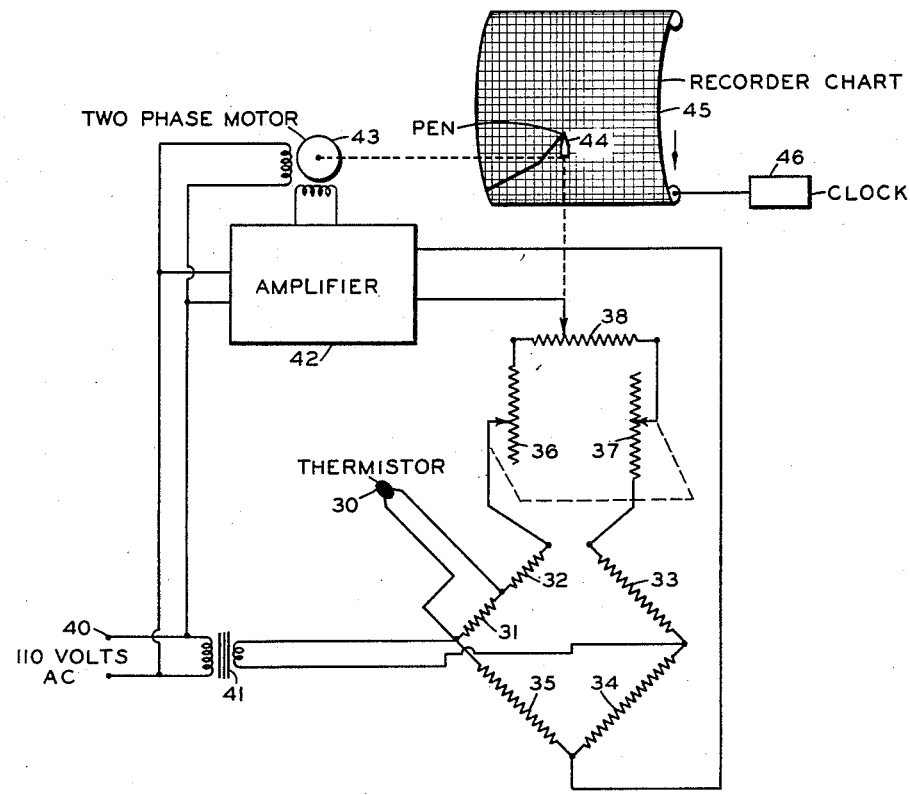

July 16, 1957  J. W. HUTCHINS  2,799,758
ELECTRICAL TEMPERATURE INDICATING DEVICE
Filed Sept. 24, 1951  2 Sheets-Sheet 1

INVENTOR.
J. W. HUTCHINS
BY
ATTORNEYS

United States Patent Office 2,799,758
Patented July 16, 1957

1

2,799,758

ELECTRICAL TEMPERATURE INDICATING DEVICE

Joseph W. Hutchins, Bartlesville, Okla., assignor to Phillips Petroleum Company, a corporation of Delaware Application September 24, 1951, Serial No. 248,048

11 Claims. (Cl. 201—63)

This invention relates to apparatus for indicating changes in temperature. In one of its aspects it relates to a thermal-electric probe for detecting changes in temperature. In another aspect it relates to apparatus for recording a time-temperature curve. In a preferred embodiment it relates to apparatus for recording a cooling curve for a concentrated aqueous solution of ammonium nitrate.

A common difficulty encountered with commercially available temperature recording instruments in that there is a definite and noticeable time lag between the detection of temperature changes and the recording of them. When working with highly concentrated aqueous salt solutions this problem becomes acute since it is possible for the solution to "freeze" and become unworkable before a desired characteristic can be ascertained from a cooling curve. Another problem involves the sensitivity of the thermal-electric temperature sensing element. An ordinary thermocouple though sensitive is not sensitive enough to detect very small temperature changes because the electromotive force generated therein is extremely small and unpractical. The present invention helps alleviate these problems and makes it possible to instrumentate and make automatic the determination of the fudge and mush points of a concentrated aqueous solution of ammonium nitrate.

By way of explanation, in the production of prilled ammonium nitrate fertilizer, it is essential that close control be maintained over the concentration of the solution of ammonium nitrate being fed to the sprayers at the top of the prilling tower. One method for quickly determining the concentration of the solution is to determine its fudge or mush point. By "fudge point" as used herein I mean that temperature when cooling a concentrated aqueous solution of ammonium nitrate at which the nuclei of ammonium nitrate crystals just begin to form, and by "mush point" as used herein I mean that temperature at which the mixture of crystallized ammonium nitrate and solution becomes mushy. In the concentration range of 95.6 to 98 percent of saturation the fudge point is the temperature at the first break in the time-temperature cooling curve of the solution and the mush point is the temperature at the second break in the cooling curve. At concentrations below 95.5 percent the fudge and mush points occur at the same point in the cooling curve. It should be stated, however, that the terms "fudge point" and "mush point" have no generally accepted meaning in the art and their connotations may vary. The fudge and mush points of a concentrated aqueous solution of ammonium nitrate are in a general way proportional to the concentration of the solution, i. e., as the concentration of the solution increases the fudge and mush point temperatures increase. The fudge point does not vary at the same rate as the mush point with changes in the concentration of the solution. The fudge or mush point temperatures of a solution of ammonium nitrate of desired concentration can readily be determined by one skilled in the art. If the fudge or mush point temperatures are above the predetermined values corresponding to the desired concentration, indicating too high a concentration, the evaporator may be controlled to alleviate the problem. A method of controlling the concentration of a solution of ammonium nitrate is disclosed and claimed in the copending application of Russell K. Simms, filed August 20, 1951, Serial No. 242,765, now Patent No. 2,734,566.

It is an object of this invention to provide apparatus for indicating changes in temperature.

A further object of this invention is to provide a thermal-electric temperature-sensitive probe for detecting change in temperature.

Another object of this invention is to provide apparatus for recording a time-temperature curve.

Still another object of this invention is to provide apparatus for recording the cooling curve of a concentrated aqueous solution of ammonium nitrate.

Other objects and advantages of this invention will be apparent to one skilled in the art from the accompanying disclosure and discussion.

Figure 1:
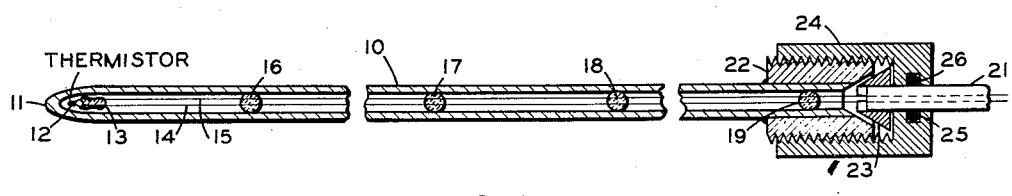
Figure 3:
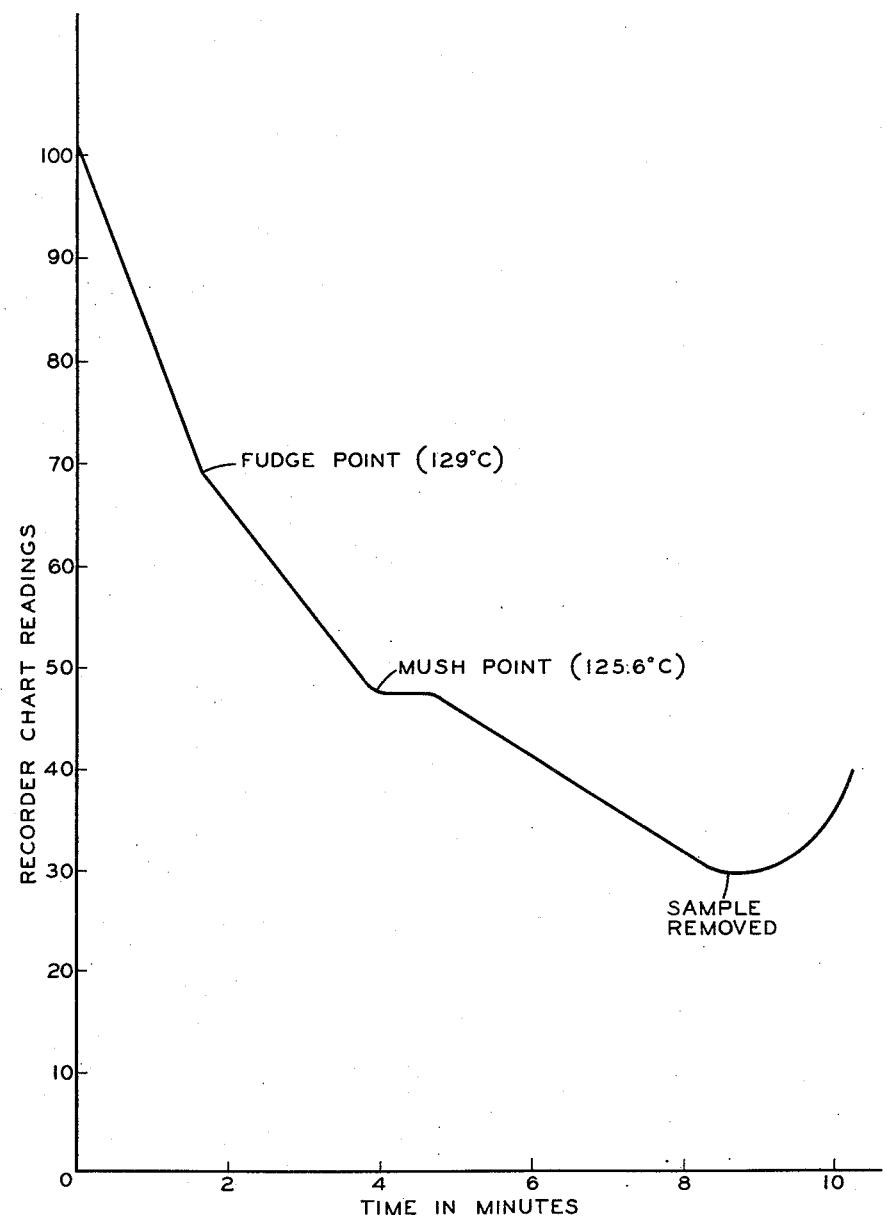

Figure 1 illustrates diagrammatically one modification of the thermal-electric temperature-sensitive probe of my invention. Figure 2 is a schematic drawing of a preferred embodiment of a circuit including the new probe of my invention. Figure 3 represents a typical cooling curve of a concentrated aqueous solution of ammonium nitrate as recorded on the chart of the apparatus of my invention.

Broadly, according to a preferred embodiment, my invention is comprised of a thermal-electric temperature-sensitive probe comprising a conduit closed at one end, a thermally sensitive resistance element positioned in said closed end supported therein and insulated therefrom by an insulator, two lead wires attached to said element and extending through said conduit, means for supporting said lead wires within said conduit and separating each from the other and both from said conduit, a two-conductor insulated cable attached to said lead wires, means for sealing the inside of said conduit, and means for clamping said insulated cable firmly to said conduit, said probe forming a part of a balanced electrical circuit, means for balancing said circuit, an amplifier connected to amplify unbalance in said circuit, a source of potential imposed across said circuit, means for recording unbalance in said circuit with time, and a reversible motor operated by said source of potential and unbalance voltage to operate said balancing means and indicate unbalance upon said recording means. This unbalance can be translated into temperature by calibration with conventional temperature measuring devices at a known temperature. A preferred thermally-sensitive resistance element is a Thermistor which is extremely sensitive to minute changes in temperature. Thus my invention will provide an apparatus for recording a time-temperature curve which has sufficient sensitivity without appreciable time lag.

A preferred embodiment of my invention has particular applicability in the apparatus disclosed and claimed in the copending application of D. E. Lupfer, E. E. Kleinmann and W. R. Eddy, filed September 24, 1951, Serial No. 248,066, now Patent No. 2,672,751, for the continuous and automatic determination of time-temperature curves of a solution. It is necessary, however, to add a device, such as a mercury switch, which, when a predetermined lower temperature is recorded, will actuate a cycle timer which in turn actuates solenoid operated valves to accomplish the desired results.

It is possible, by the utilization of suitable electrical instruments, to make automatic the entire operation of producing ammonium nitrate solution of a desired concentration. In this manner the fudge point or mush point could be taken from the recorder of my invention by said suitable electrical instrument, and in response to a variation from a predetermined value, control the evaporator as hereinbefore described.

Referring now to Figure 1, illustrated is a preferred construction of the thermal-electric temperature-sensitive probe. Thin-walled, aluminum tube 10 is closed and pointed at end 11. Within closed end 11 thermistor 12 is positioned partially encased in glass insulator 13 and held away from the inner walls thereby. Lead wires 14 and 15, attached to thermistor 12, extend through glass insulator 13 and toward the other end of tube 10 separated from each other and from the inner walls of tube 10 and supported by ceramic insulators 16, 17, 18, and 19. Lead wires 14 and 15 are soldered to rubber-covered two-conductor shielded cable 21 which is connected into an electrical circuit as illustrated in Figure 2. Threaded collar 22 is fitted over the other end of tube 10 and welded thereto to secure it firmly. The open end of tube 10 and collar 22 are beveled inwardly to accept tapered split collet 23 which fits over the end of the shielding of cable 21. Adapted to fit over threaded collar 22 and force split collet 23 into the beveled opening thus holding cable 21 firmly is aluminum fitting 24. Fitting 24 has a circular opening through which cable 21 passes, and midway between the extremities of said opening is a small concentric recess 25 into which O ring 26 is positioned. The purpose of the O ring is to prevent moisture or liquid solution from entering the probe. The thermistor employed is comprised of a material which has a negative temperature coefficient and is extremely sensitive to minute changes in temperature. An example is silver sulfide. It is also possible to use a bolometer, which is a blackened platinum strip, as the extremely thermally sensitive resistance element of the probe. It is also possible to substitute mechanical equivalents for some of the elements of the probe.

Referring now to Figure 2 in detail, the specific probe of Figure 1, indicated by reference numeral 30 and the legend "Thermistor" is connected in shunt with resistance 31 to form part of one arm of a Wheatstone bridge circuit. The rest of said bridge circuit is comprised of precision wire wound resistances 32, 33, 34 and 35, variable resistances 36 and 37 and potentiometer 38. Variable resistances 36 and 37 are connected to a common control shaft in such a fashion that rotation of the shaft increases the ohmic value of one of said variable resistances and decreases the ohmic value of the other variable resistance. Thus, these ganged resistances may be used to adjust the temperature level at which the apparatus operates. Also, by changing the ohmic value of shunt resistance 31 the range of temperature recorded can be varied. As the ohmic value of shunt resistance 31 increases, the temperature range decreases. For example, if the thermally-sensitive resistance element is a type IC thermistor, resistance 32 has a value of 150 ohms, resistance 33 737 ohms, resistances 34 and 35 1000 ohms each, and variable resistances 36 and 37 an effective resistance of 50 ohms, then a value of 750 ohms for shunt resistance 31 will result in an 18° C. temperature span on the scale of the instrument. A value of 897 ohms for resistance 31 will give a 17° C. temperature span on the instrument, and an ohmic value of 947 ohms will give a 15° C. temperature span. Alternating current source 40 is connected across the primary coil of transformer 41, is connected to supply power to amplifier 42 and is connected across one coil of two phase motor 43. The 8 volt potential from the secondary coil of transformer 41 is imposed across the Wheatstone bridge circuit at the junction between resistances 33 and 34 and at the junction between resistances 31 and 35. Since the Wheatstone bridge is measuring resistance, the introduction of a known voltage is not required, so it is not necessary to use a standardizing circuit. Unbalance voltage in the bridge caused by changes in the resistance of the thermistor element in probe 30 is fed to amplifier 42 from the slide wire of potentiometer 38 and the junction between resistances 34 and 35 where it is amplified, the output of said amplifier being connected across the other coil of two phase motor 43. When motor 43 is thus actuated it moves the slide wire of potentiometer 38 to a null-balance position thus balancing the circuit and concomitantly driving pen 44 upon chart 45 which is being moved at a constant rate of speed by clock 46. Thus if probe 30 is placed in a hot concentrated aqueous solution of ammonium nitrate which is allowed to cool the changes in temperature will be reflected by changes in the resistance of probe 30. These changes in resistance will cause an unbalance to result in the Wheatstone bridge circuit which will in turn actuate motor 43 to balance the circuit and record a characteristic curve on moving chart 45. Of course, it is necessary to translate the readings recorded as changes in resistance on the chart to changes in temperature. This may be done by calibration of the instrument with conventional temperature measuring devices at a known temperature.

Referring to Figure 3 of the drawings, shown is a typical cooling curve for a concentrated aqueous solution of ammonium nitrate. The aforementioned translations have been made and it can be seen that the fudge point occurred at a temperature of 129° C. and the mush point at 125.6° C. One skilled in the art will appreciate that the drawing as shown may be considered to be on its side. That is, time as actually observed on the chart of the instrument will appear as an ordinate rather than an abscissa as illustrated.

My invention has been described and exemplified in terms of a preferred embodiment. It will be readily appreciated that modifications may be made without departing from the spirit and scope of my invention.

I claim:

1. A thermal-electric temperature-sensitive probe comprising, in combination, a thin-walled aluminum tube closed and pointed at one end; a thermistor element; a glass insulator partially encasing said thermistor element and positioned in said pointed end insulating therefrom and supporting therein the exposed part of said thermistor element; two lead wires attached to said thermistor element and extending through said glass insulator and tube; at least one ceramic insulator positioned within said tube supporting said lead wires and separating each from the other and both from said tube; a rubber-covered two-conductor shielded cable attached to said lead wires; a collar fitted and fastened concentrically over the other end of said tube and provided with outer threads, the open end of said tube and collar being beveled inwardly; an aluminum fitting adapted to fit over said threaded collar having a circular hole through which said cable passes, said hole having a concentric recess midway between the extremities thereof; an O ring positioned in said recess and fitting snugly around said cable; and a tapered split collet fitting over the end of the shielding on said cable and into the beveled opening of said tube and collar and adapted to hold said shielded cable firmly when the aluminum fitting is tightened over said threaded collar.

2. A thermal-electric temperature-sensitive probe comprising, in combination, an aluminum tube closed at one end; a thermistor element; an insulator partially encasing said thermistor element and positioned in said closed end insulating therefrom and supporting therein the exposed part of said thermistor element; two lead wires attached to said thermistor element and extending through said insulator and tube; at least one insulator positioned within said tube supporting said lead wires and separating each from the other and both from said tube; a two-conductor insulated cable attached to said lead wires; a collar fastened concentrically over the other end of said tube and provided with outer threads, the open end of said tube and collar being beveled inwardly; a fitting adapted to fit over said threaded collar and having a hole through which said cable passes; a gasket positioned within said fitting and over said cable to provide a seal for the inside of said tube; and a tapered collar fitting over the end of the insulation on said cable and into the beveled opening of said tube and collar and adapted to hold said insulated cable firmly when the fitting is tightened over said threaded collar.

3. A probe according to claim 2 wherein the thermistor element is made of a material having a negative temperature coefficient.

4. A probe according to claim 2 wherein the thermistor element is made of a material having a positive temperature coefficient.

5. A probe according to claim 1 wherein the thermistor element is made of a material having a negative temperature coefficient.

6. A probe according to claim 1 wherein the thermistor element is made of silver sulfide.

7. A probe according to claim 1 wherein the thermistor element is made of a material having a positive temperature coefficient.

8. A probe according to claim 1 wherein the thermistor element is made of a platinum strip.

9. A probe according to claim 2 wherein the thermistor element is made of silver sulfide.

10. A probe according to claim 2 wherein the thermistor element is made of a platinum strip.

11. A thermal-electric temperature sensitive probe comprising, in combination, a tube of heat-conductive material closed at one end, a thermistor element within the closed end of the tube, means positioned in said closed end to support the exposed part of the thermistor element and insulate it from the tube, a pair of lead wires attached to said thermistor element and extending axially through said tube, insulating means within said tube firmly engaging the interior walls thereof, said lead wires extending through and being supported by said insulating means out of contact with each other and the inner wall of said tube, a threaded member secured to the end of said tube opposite the closed end thereof, a fitting threaded to said member, said lead wires extending axially through said fitting and said member to the exterior of said tube, and means positioned between said member and said fitting to facilitate fitting together of these parts.

References Cited in the file of this patent

UNITED STATES PATENTS

| | | |
|---|---|---|
| 2,379,530 | Lederer | July 3, 1945 |
| 2,398,892 | Kelly | Apr. 23, 1946 |
| 2,524,478 | Rutherford et al. | Oct. 3, 1950 |
| 2,526,251 | Medlar | Oct. 17, 1950 |
| 2,590,041 | Roost | Mar. 18, 1951 |
| 2,593,351 | Shannon | Apr. 15, 1952 |
| 2,612,780 | De Bruyne | Oct. 7, 1952 |

OTHER REFERENCES

Electronic Industries, page 76, January 1945.